(12) United States Patent
Onggosanusi et al.

(10) Patent No.: US 11,088,740 B2
(45) Date of Patent: Aug. 10, 2021

(54) DOWNLINK MULTIPLE INPUT MULTIPLE OUTPUT ENHANCEMENTS FOR SINGLE-CELL WITH REMOTE RADIO HEADS

(71) Applicant: TEXAS INSTRUMENTS INCORPORATED, Dallas, TX (US)

(72) Inventors: Eko Onggosanusi, Allen, TX (US); Vikram Chandrasekhar, Mountain View, CA (US); Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/955,513

(22) Filed: Apr. 17, 2018

(65) Prior Publication Data
US 2018/0234146 A1 Aug. 16, 2018

Related U.S. Application Data

(63) Continuation of application No. 14/613,176, filed on Feb. 3, 2015, now Pat. No. 10,033,447, which is a (Continued)

(51) Int. Cl.
*H04B 7/0456* (2017.01)
*H04B 7/024* (2017.01)
(Continued)

(52) U.S. Cl.
CPC ........... *H04B 7/0469* (2013.01); *H04B 7/024* (2013.01); *H04B 7/0452* (2013.01);
(Continued)

(58) Field of Classification Search
CPC .... H04B 7/024; H04B 7/0639; H04B 7/0632; H04B 7/10; H04B 7/0469; H04B 7/0691;
(Continued)

(56) References Cited

U.S. PATENT DOCUMENTS

| | | | | |
|---|---|---|---|---|
| 8,107,547 B2 * | 1/2012 | Muharemovic | ....... | H04L 1/0026 375/260 |
| 8,218,663 B2 * | 7/2012 | Muharemovic | ...... | H04B 7/0417 375/260 |

(Continued)

*Primary Examiner* — James M Perez
(74) *Attorney, Agent, or Firm* — Gregory J. Albin; Charles A. Brill; Frank D. Cimino

(57) ABSTRACT

A base station selects a subset of at least one geographically separated antennas for each of the plurality of user equipments. The base station forms at least layer of data stream including modulated symbols, precodes the data stream via multiplication with the NT-by-N precoding matrix where N is the number of said layers and NT is the number of transmit antenna elements and transmits the precoded layers of data stream to the user equipment via the selected geographically separated antennas. The base station signals the subset of the plurality of geographically separated antennas via higher layer Radio Resource Control or via a down link grant mechanism. The base station optionally does not signal the subset of the plurality of geographically separated antennas to the corresponding mobile user equipment.

30 Claims, 3 Drawing Sheets

Related U.S. Application Data continuation of application No. 13/451,718, filed on Apr. 20, 2012, now Pat. No. 8,948,293.

(60) Provisional application No. 61/477,341, filed on Apr. 20, 2011.

(51) Int. Cl.
| | | |
|---|---|---|
| *H04B 7/06* | (2006.01) | |
| *H04B 7/0452* | (2017.01) | |
| *H04W 72/12* | (2009.01) | |
| *H04B 7/0413* | (2017.01) | |
| *H04B 7/10* | (2017.01) | |

(52) U.S. Cl.
CPC ...... *H04B 7/0691* (2013.01); *H04W 72/1294* (2013.01); *H04B 7/0413* (2013.01); *H04B 7/0665* (2013.01); *H04B 7/10* (2013.01)

(58) Field of Classification Search
CPC .. H04B 7/0452; H04B 7/0413; H04B 7/0665; H04L 5/0023; H04L 5/0048; H04W 72/1294
USPC ............... 375/130–137, 140–153, 259–261, 375/271–272, 278–285, 295–296, 298, 375/300, 302–304, 316, 320, 322–325, 375/329, 340–343, 346–351
See application file for complete search history.

(56) References Cited

U.S. PATENT DOCUMENTS

| | | | | |
|---|---|---|---|---|
| 8,250,425 B2* | 8/2012 | Wong | H04L 1/1864 | 714/749 |
| 8,599,711 B2* | 12/2013 | Hugl | H04B 7/0632 | 370/252 |
| 8,625,703 B2* | 1/2014 | Ko | H04B 7/0452 | 375/284 |
| 8,699,633 B2* | 4/2014 | Erell | H04L 5/0051 | 375/340 |
| 8,711,716 B2* | 4/2014 | Chen | H04B 7/0452 | 370/252 |
| 8,743,782 B1* | 6/2014 | Patel | H04W 4/20 | 370/328 |
| 8,948,293 B2* | 2/2015 | Onggosanusi | H04B 7/0469 | 375/284 |
| 9,125,091 B2* | 9/2015 | Heo | H04W 76/10 | |
| 9,270,347 B2* | 2/2016 | Fong | H04W 72/085 | |
| 9,456,372 B2* | 9/2016 | Lee | H04B 7/0626 | |
| 9,532,333 B2* | 12/2016 | Hammarwall | H04L 5/0035 | |
| 9,532,362 B2* | 12/2016 | Marinier | H04B 7/0617 | |
| 9,614,653 B2* | 4/2017 | Kim | H04L 27/2675 | |
| 10,033,447 B2* | 7/2018 | Onggosanusi | H04B 7/0691 | |
| 10,057,839 B2* | 8/2018 | Ng | H04L 27/2692 | |
| 10,084,651 B2* | 9/2018 | Chai | H04L 1/0026 | |
| 10,560,327 B2* | 2/2020 | Chai | H04L 5/0035 | |
| 10,708,028 B2* | 7/2020 | Nam | H04W 24/10 | |
| 2006/0184480 A1* | 8/2006 | Ayyar | G06F 9/50 | 706/45 |
| 2007/0086439 A1* | 4/2007 | Schneider | H04L 29/06027 | 370/352 |
| 2008/0192811 A1 | 8/2008 | Son | | |
| 2008/0192849 A1* | 8/2008 | Kim | H04L 1/06 | 375/260 |
| 2009/0017769 A1* | 1/2009 | Chen | H04B 7/0639 | 455/69 |
| 2009/0262695 A1* | 10/2009 | Chen | H04B 7/0456 | 370/329 |
| 2010/0027456 A1* | 2/2010 | Onggosanusi | H04L 5/0023 | 370/312 |
| 2010/0034312 A1* | 2/2010 | Muharemovic | H04L 5/0048 | 375/267 |
| 2010/0067512 A1* | 3/2010 | Nam | H04L 5/0023 | 370/342 |
| 2010/0074183 A1* | 3/2010 | Chen | H04B 17/24 | 370/328 |
| 2010/0080112 A1* | 4/2010 | Bertrand | H04L 27/2657 | 370/208 |
| 2010/0118817 A1* | 5/2010 | Damnjanovic | H04B 7/0634 | 370/329 |
| 2010/0189038 A1* | 7/2010 | Chen | H04L 5/0023 | 370/328 |
| 2010/0238877 A1* | 9/2010 | Nam | H04L 27/2601 | 370/329 |
| 2010/0309775 A1* | 12/2010 | Muharemovic | H04J 13/0062 | 370/210 |
| 2010/0323612 A1* | 12/2010 | Xu | H04B 7/022 | 455/7 |
| 2011/0038310 A1* | 2/2011 | Chmiel | H04L 27/2613 | 370/328 |
| 2011/0085610 A1* | 4/2011 | Zhuang | H04B 7/0626 | 375/260 |
| 2011/0103324 A1* | 5/2011 | Nam | H04W 72/042 | 370/329 |
| 2011/0116437 A1* | 5/2011 | Chen | H04B 7/0689 | 370/312 |
| 2011/0141987 A1* | 6/2011 | Nam | H04L 5/0053 | 370/329 |
| 2011/0176581 A1* | 7/2011 | Thomas | H04L 5/0026 | 375/146 |
| 2011/0199986 A1* | 8/2011 | Fong | H04L 5/0073 | 370/329 |
| 2011/0201324 A1* | 8/2011 | Persson | H04W 24/10 | 455/422.1 |
| 2011/0235743 A1* | 9/2011 | Lee | H04J 11/00 | 375/295 |
| 2011/0237283 A1* | 9/2011 | Shan | H04L 5/0091 | 455/509 |
| 2011/0260941 A1* | 10/2011 | Jones | H01Q 9/0435 | 343/776 |
| 2011/0305161 A1* | 12/2011 | Ekpenyong | H04L 5/0048 | 370/252 |
| 2011/0317643 A1* | 12/2011 | Gaal | H04L 5/0053 | 370/329 |
| 2011/0319109 A1* | 12/2011 | Kang | H04L 5/001 | 455/507 |
| 2012/0020272 A1* | 1/2012 | Lee | H04L 5/0048 | 370/312 |
| 2012/0033643 A1* | 2/2012 | Noh | H04L 5/0048 | 370/335 |
| 2012/0077485 A1* | 3/2012 | Shin | H04B 7/0619 | 455/422.1 |
| 2012/0176884 A1* | 7/2012 | Zhang | H04W 72/042 | 370/203 |
| 2012/0176939 A1* | 7/2012 | Qu | H04L 5/0023 | 370/255 |
| 2012/0207105 A1* | 8/2012 | Geirhofer | H04W 36/0077 | 370/329 |
| 2012/0220286 A1* | 8/2012 | Chen | H04W 24/10 | 455/422.1 |
| 2012/0257660 A1* | 10/2012 | Smith | H04L 25/0212 | 375/224 |
| 2012/0264441 A1* | 10/2012 | Chandrasekhar | H04L 5/0073 | 455/450 |
| 2012/0269142 A1* | 10/2012 | Porat | H04L 27/2618 | 370/329 |
| 2012/0269278 A1* | 10/2012 | Onggosanusi | H04W 72/1294 | 375/267 |
| 2012/0269283 A1* | 10/2012 | Erell | H04L 25/03343 | 375/267 |
| 2012/0270535 A1* | 10/2012 | Chen | H04B 7/0486 | 455/422.1 |
| 2013/0003788 A1* | 1/2013 | Marinier | H04B 7/024 | 375/219 |
| 2013/0039203 A1* | 2/2013 | Fong | H04B 7/024 | 370/252 |
| 2013/0039284 A1* | 2/2013 | Marinier | H04L 5/001 | 370/329 |

(56) References Cited

U.S. PATENT DOCUMENTS

| | | | |
|---|---|---|---|
| 2013/0094411 A1* | 4/2013 | Zhang | H04L 5/0048 370/281 |
| 2013/0128760 A1* | 5/2013 | Fujishima | H04W 72/04 370/252 |
| 2013/0188558 A1* | 7/2013 | Nam | H04W 24/02 370/328 |
| 2013/0208604 A1* | 8/2013 | Lee | H04B 7/0626 370/252 |
| 2013/0208678 A1* | 8/2013 | Zhang | H04L 5/0053 370/329 |
| 2013/0229985 A1* | 9/2013 | Kim | H04B 7/024 370/328 |
| 2013/0250913 A1* | 9/2013 | Geirhofer | H04L 5/0057 370/331 |
| 2013/0301467 A1* | 11/2013 | Kang | H04B 7/024 370/252 |
| 2013/0322288 A1* | 12/2013 | Zhang | H04B 7/0626 370/252 |
| 2013/0322376 A1* | 12/2013 | Marinier | H04B 7/0617 370/329 |
| 2014/0016591 A1* | 1/2014 | Kim | H04J 11/005 370/329 |
| 2014/0022988 A1* | 1/2014 | Davydov | H04L 5/0053 370/328 |
| 2014/0092827 A1* | 4/2014 | Jongren | H04L 25/0222 370/329 |
| 2014/0119266 A1* | 5/2014 | Ng | H04L 27/2602 370/312 |
| 2014/0126490 A1* | 5/2014 | Chen | H04L 1/0038 370/329 |
| 2014/0229570 A1* | 8/2014 | Westberg | H04W 28/0236 709/217 |
| 2015/0131604 A1* | 5/2015 | Hammarwall | H04W 72/042 370/330 |
| 2015/0131749 A1* | 5/2015 | Slomina | H04L 27/2666 375/260 |
| 2015/0136828 A1 | 5/2015 | Li | |
| 2015/0146676 A1* | 5/2015 | Onggosanusi | H04B 7/0452 370/329 |
| 2015/0236828 A1* | 8/2015 | Park | H04L 27/2656 375/340 |
| 2016/0142189 A1* | 5/2016 | Shin | H04L 5/0048 370/329 |
| 2016/0294527 A1* | 10/2016 | Yoon | H04L 5/0051 |
| 2017/0012691 A1* | 1/2017 | Lee | H04B 17/345 |
| 2017/0238323 A1* | 8/2017 | Marinier | H04B 7/0626 370/329 |
| 2018/0234146 A1* | 8/2018 | Onggosanusi | H04B 7/0452 |
| 2018/0262313 A1* | 9/2018 | Nam | H04L 5/005 |
| 2019/0190582 A1* | 6/2019 | Guo | H04B 7/0695 |
| 2020/0053724 A1* | 2/2020 | MolavianJazi | H04W 52/346 |
| 2020/0221323 A1* | 7/2020 | Xu | H04L 5/0048 |

* cited by examiner

DOWNLINK MULTIPLE INPUT MULTIPLE OUTPUT ENHANCEMENTS FOR SINGLE-CELL WITH REMOTE RADIO HEADS

CLAIM OF PRIORITY

This application is a Continuation of application Ser. No. 14/613,176 filed Feb. 3, 2015, which is a Continuation of application Ser. No. 13/451,718 filed Apr. 20, 2012, now U.S. Pat. No. 8,948,293, which claims priority under 35 U.S.C. 119(e)(1) to U.S. Provisional Application No. 61/477,341 filed Apr. 20, 2011.

TECHNICAL FIELD OF THE INVENTION

The technical field of this invention is wireless communication such as wireless telephony.

BACKGROUND OF THE INVENTION

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Channel State Information Reference Signals (CSI-RS) and Dedicated or Demodulating Reference Signals (DMRS). These reference signals are useful for channel estimation at the receiver. In a multi-input multi-output (MINO) communication systems with multiple transmit/receive antennas, the data transmission is performed via precoding. Here, precoding refers to a linear (matrix) transformation of a L-stream data into P-stream where L denotes the number of layers (also, termed the transmission rank) and P denotes the number of transmit antennas. With the use of dedicated (user-specific) DMRS, a transmitter (base station, also termed an eNodeB or eNB) can perform any precoding operation which is transparent to a user equipment (UE) which acts as a receiver. At the same time, it is beneficial for the base station to obtain a recommendation on the choice of precoding matrix from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNodeB is preferred. To enable a codebook-based feedback, a precoding codebook needs to be designed.

To extend cell coverage and service over a wide area, employing remote radio heads (RRHs) is beneficial. Multiple units of RRH are distributed over a wide area and act as multiple distributed antennas for the eNodeB. For downlink transmissions, each RRH unit is associated with a unit of transmit radio device—which constitutes to at least one antenna element along with the associated radio and analog front-end devices. Each unit of RRH is positioned relatively far from the eNodeB and typically connected via a low-latency line such as fiber optic link. Some exemplary configurations are depicted in FIG. 1 where six RRHs are utilized. Depending on whether each RRH is equipped with a single or dual antenna elements, up to 12 antenna elements can be supported.

While the LTE cellular standard along with its further evolution LTE-Advanced (also known as the E-UTRA and further enhanced E-UTRA, respectively) offer a solid support of MIMO technology, the MIMO mechanism supported in the specification was primarily designed for co-located antenna elements. In Rel-10 LTE-A, some support for RRH-based configuration was provisioned for the use in the context of the coordinated multi-point (COMP) transmission. While the preceding approaches provide improvements in wireless communications, the present inventors recognize that still further improvements in downlink (DL) spectral efficiency are possible when RRH-based configuration is employed. Accordingly, the preferred embodiments described below are directed toward these problems as well as improving upon the prior art.

SUMMARY OF THE INVENTION

A method and apparatus of wireless communication between a base station having a plurality of geographically separated antennas and a plurality of user equipments. The base station selects a subset of at least one of the geographically separated antennas for each of the plurality of user equipments. The base station forms at least one layer of data stream including modulated symbols for each user equipment. The base station precodes the data stream for each user equipment via multiplication with the NT-by-N precoding matrix where N is the number of said layers and NT is the number of transmit antenna elements. The base station transmits the precoded layers of data stream to the user equipment via the selected geographically separated antennas.

The base station signals the subset of the plurality of geographically separated antennas to the corresponding user equipment via higher layer Radio Resource Control or via a down link grant mechanism. The base station optionally does not signal the subset of the plurality of geographically separated antennas to the corresponding mobile user equipment.

The base station semi-statically selects the subset of the plurality of geographically separated antennas for user equipment having a Doppler indicating a rate of motion less than a predetermined amount. The base station dynamically selects the subset of the plurality of geographically separated antennas for user equipment having a Doppler indicating a rate of motion greater than the predetermined amount. In this case the base station selection may be responsive to a user equipment recommendation.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
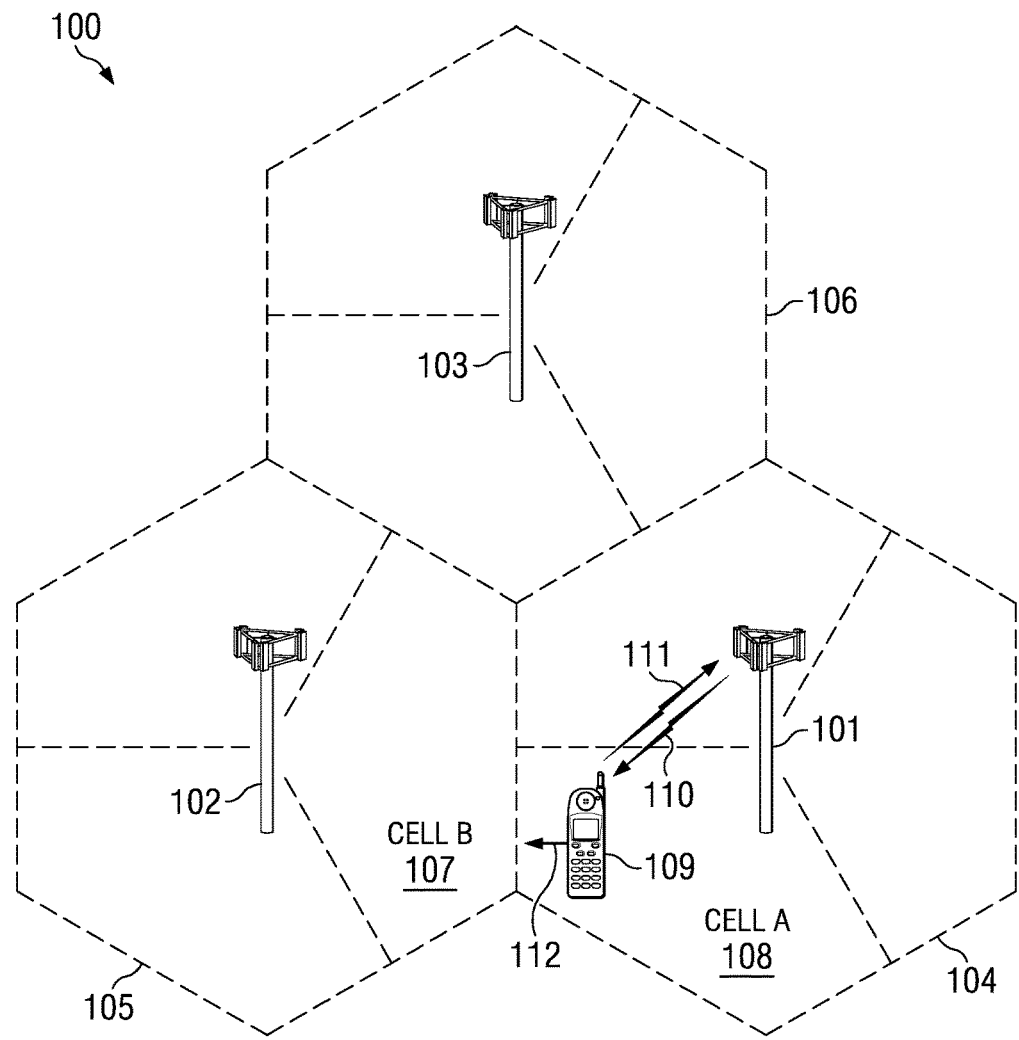
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

The preferred embodiments of the present invention provide improved communication through multi-antenna transmission over multiple units of remote radio heads (RRHs). There are a number of possibilities in how RRHs are deployed within a single cell.

Figure 2:
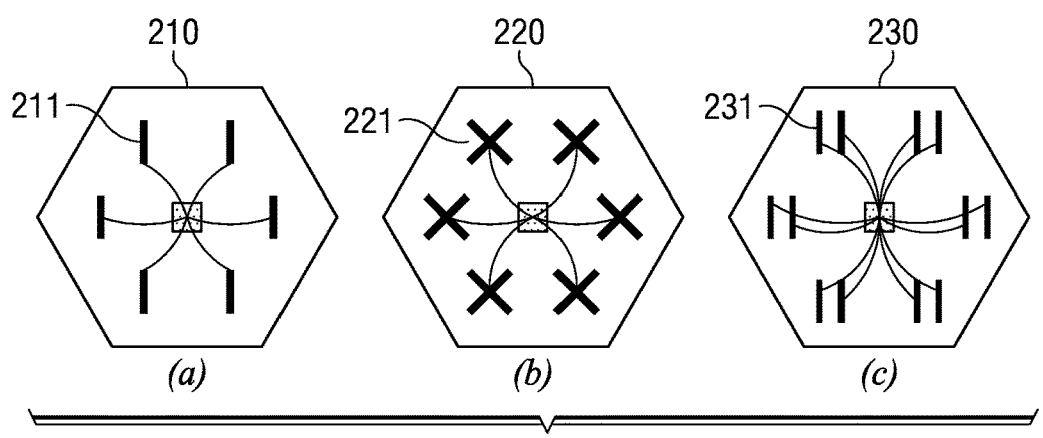
FIG. 2 shows a number of possibilities in how RRHs are deployed within a single cell according to the prior art.

It is useful to first identify and summarize the characteristics of single-cell deployment with RRHs. In principle, there are a number of possibilities in how RRHs are deployed within a single cell. Some possibilities are illustrated in FIG. 2. Each RRH unit may be: a single-polarized (dipole) antenna element; a dual-polarized antenna element; a small (e.g. 2-element) antenna array where each element is either single or dual-polarized.

FIG. 2 illustrates one cell of a wireless communication system with plural geographically separated antennae. Each cell 210, 220 and 230 have 6 RRH units. In cell 210 each antenna is one single-polarized antenna 211. In cell 220 each antenna is one dual-polarized antenna 221. In cell 230 each antenna is two single-polarized antennas 231. A RRH unit refers to a geographically separated unit which may include single or multiple antenna element(s) and/or RF unit(s). For DL MIMO some consideration of applicable configurations is beneficial. Different configurations may impose different design constraints.

Multiple RRHs within a single cell can be regarded as a distributed MIMO system where different RRH units undergo different delays from/to a given UE. There is significant gain imbalance relative to the UE across different RRH units. The associated spatial channels tend to be almost uncorrelated across different RRH units. These characteristics impose some design constraints if some potential enhancements are to be included solely for this scenario.

Due to the characteristics mentioned above a single-cell with multiple RRHs can be operated aa follows. For a given UE, the eNB chooses a subset of all the available RRH units. This solution is technically sound from capacity perspective. While a subset may contain all the available RRHs within the cell, it is unnecessary when the cell is sufficiently large and coverage improvement takes more precedence over capacity improvement. Consequently, this RRH subset of all the available RRH units is UE specific.

Dynamic RRH subset selection is expected to be better but costly in signaling requirements. A new DL grant mechanism or a System information Block Broadcast (SIB-x) on a dedicated Broadcast CHannel (BCH) with $0 \leq x \leq 13$ which signals the RRH subset is needed. Dynamic RRH subset selection also allows the possibility for the UE to recommend the RRH subset. This leads to a new CSI feedback mechanism. The UE needs to perform measurements on all the available RRHs.

Semi-static RRH subset selection is simpler. A Rel. 8 mechanism which indicates the number of antenna ports, which is a broadcast parameter for Rel. 8, can be used. However this needs to be UE specific. To signal the RRH subset, some additional Radio Resource Control (RRC) signaling capability is needed.

In a first alternative the UE may not need to know which RRH subset is used particularly if the CSI-RS is UE specific. That is, if the RRH subset is transparent to all the UEs.

In a second alternative all the UEs may know all the RRHs. Thus the UE needs to know the RRH subset. In this alternative the RRH subset is RRC signaled. This may lead to some further complication and thus the first alternate above may be preferred.

This invention includes a combination (hybrid) of dynamic and semi-static signaling. The semi-static signaling configures a semi-static subset of RRHs via higher-layer RRC signaling. This semi-static signaling includes a list of CSI-RS patterns. Thus the UE knows the association between each pattern and the corresponding RRH. The semi-static signaling further specifies the relationship between each RRH and the set of antenna ports (7, 8, . . . 6+v, where v is the number of layers) on which the UE receives its UE-RS. This ensures that when the subset of RRHs the UE uses to communicate changes, the UE knows the corresponding CSI-RS and UE-RS patterns for estimating its channels to the new subset of RRHs to which it communicates. Dynamic signaling is used to select a smaller subset from the semi-static subset. In a first example this uses a DL grant mechanism. The DL grant carries an additional field which informs the UE of the assigned subset of RRHs or RRH units. In a second example the dynamical signaling is conveyed via dedicated signaling on SIB-x with $0 \leq x \leq 13$.

Because the RRH units are well distributed across the cell, semi-static signaling of the RRH subset is expected to be sufficient in most scenarios. This applicable when the cell is large and/or the UE moves at a reasonable speech. This would probably not be applicable for UE on a high-speed train where RRHs are deployed along a subway tunnel to provide reasonable coverage for a UE inside the subway. In this case, the UE moves at a very high speed of about 350 kilometers per hour and the RRH subset may change rapidly.

The hybrid scheme is beneficial in this case because it allows faster update of the RRH subset. The eNb detects the speed of motion of a UE through the size of the Doppler shift in its Up Link transmissions.

Because the RRH subset is UE specific, the CSI-RS configuration also needs to be UE specific. A UE specific CSI-RS configuration is supported in Rel. 10. Thus the number of antenna ports, the CSI-RS pattern, the muting pattern if muting is configured can be made UE specific. The Rel. 10 UE specific CSI-RS support seems sufficient especially for the above first alternative for semi-static scheduling. If second semi-static scheduling alternative is used, the RRH subset which corresponds to the subset of all the available CSI-RS ports can be mapped directly onto the RRH units.

Figure 3:
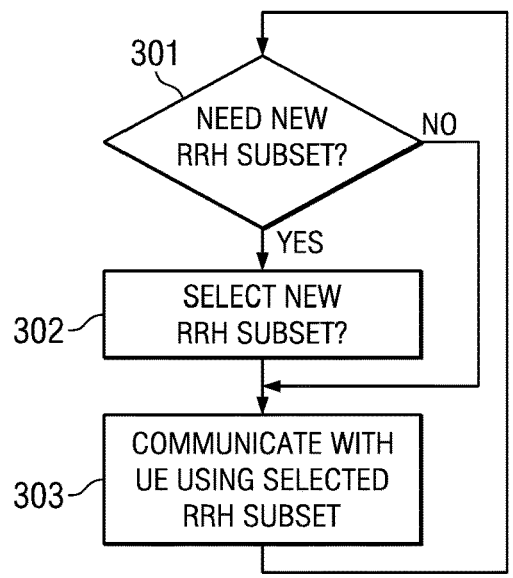
FIG. 3 is a flow chart of the operation in this invention.

FIG. 3 is a flow chart of the operation of the eNB in this invention. In decision step 301 the eNB determines whether the RRH subset for a particular UE needs to be updated. If this is true (Yes at decision block 301), then in processing block 302 the eNB selects the new RRH subset for the UE. Thereafter the eNB communicates with the UE using the selected subset in processing block 303. If this is not true (No at decision block 301), the the eNB communicates with the UE using the selected subset in processing block 303. In this event the selected RRH subset is the prior RRH subset. Because the RRH subset of this invention is UE specific, the eNB needs to perform this process for each UE.

Figure 4:
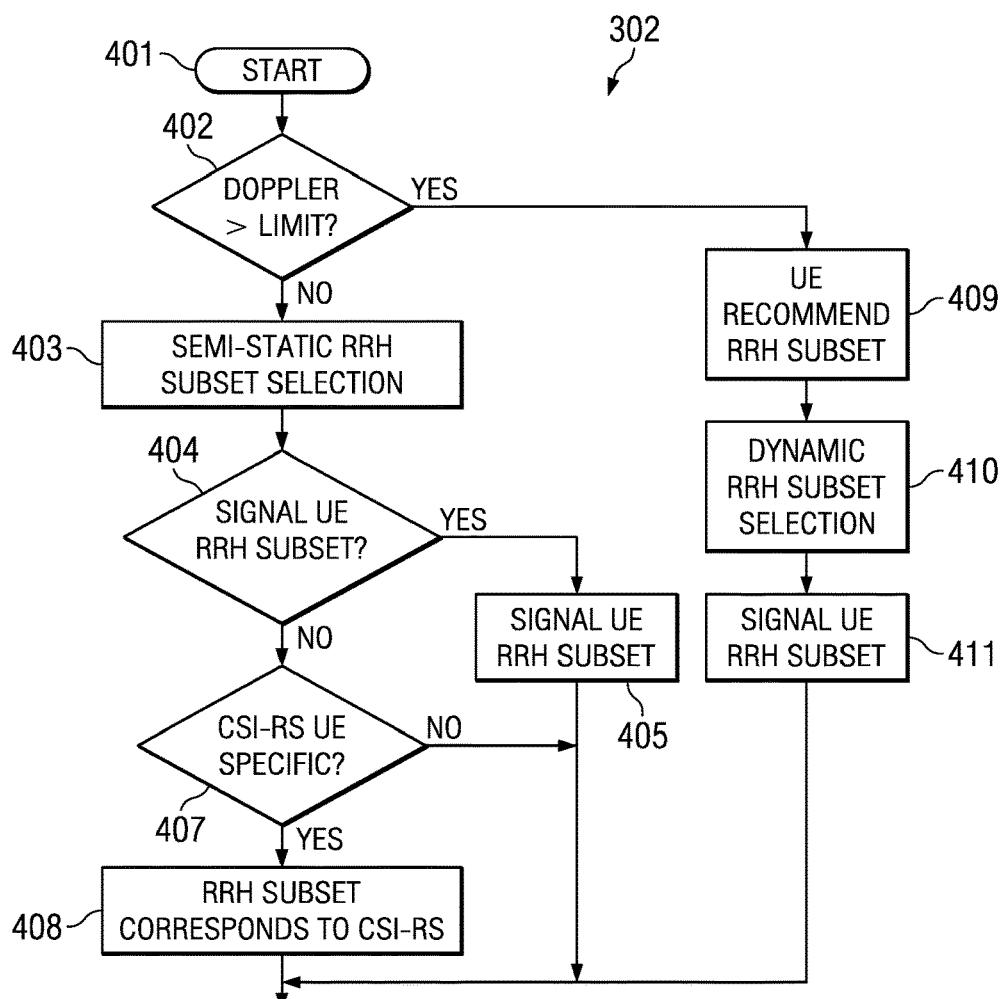
FIG. 4 is a flow chart illustrating an embodiment of one processing block of FIG. 3.

FIG. 4 is a flow chart illustrating an embodiment of processing block 302 of FIG. 3. Some of the operations in FIG. 4 are preformed by the eNB and some are performed by the UE. Processing block 302 of this embodiment begins at start block 401. Decision block 402 determines whether the Doppler of the particular UE is greater than a predetermined limit. This process is preformed by the eNB. If the Doppler is not greater than the limit (No at decision block 402), then the eNB semi-statically selects the new RRH subset in processing block 403. In decision block 404 the eNB determines whether the UE is to be signaled of the RRH subset. The above description noted that signaling the UE of the selected RRH subset is optional. If the UE is to be signaled of the RRH subset (Yes at decision block 404), then the eNB signals the UE of the selected RRH subset in processing block 405. The above description states that this notification occurs via higher-layer RRC signaling when semi-static selection is used. Processing block 302 is exited to processing block 303 via continue block 406.

If the UE is not to be signaled of the RRH subset (No at decision block 404), then the eNB determines at decision block 407 whether the CSI-RS is UE specific. If this is not true (No at decision block 407), then processing block 302 is exited to processing block 303 via continue block 406. If this is true (Yes at decision block 407), then eNB selects a RRH subset that corresponds to the UE specific CSI-RS. The particular UE knows of this correlation between UE specific CSI-RS and UE specific RRH subset and communicates with the eNB accordingly. Processing block 302 is exited to processing block 303 via continue block 406.

If the Doppler is greater than the limit (Yes at decision block 402), then the eNB is optionally responsive to RRH subset recommendation from the UE. The eNB then dynamically selects the RRH subset for the particular UE in processing block 410. The eNB signals the UE of the particular RRH subset in processing block 411. As noted above this signaling can be via a DL grant carrying an additional field of via dedicated signaling on SIB-x. Processing block 302 is exited to processing block 303 via continue block 406.

Figure 5:
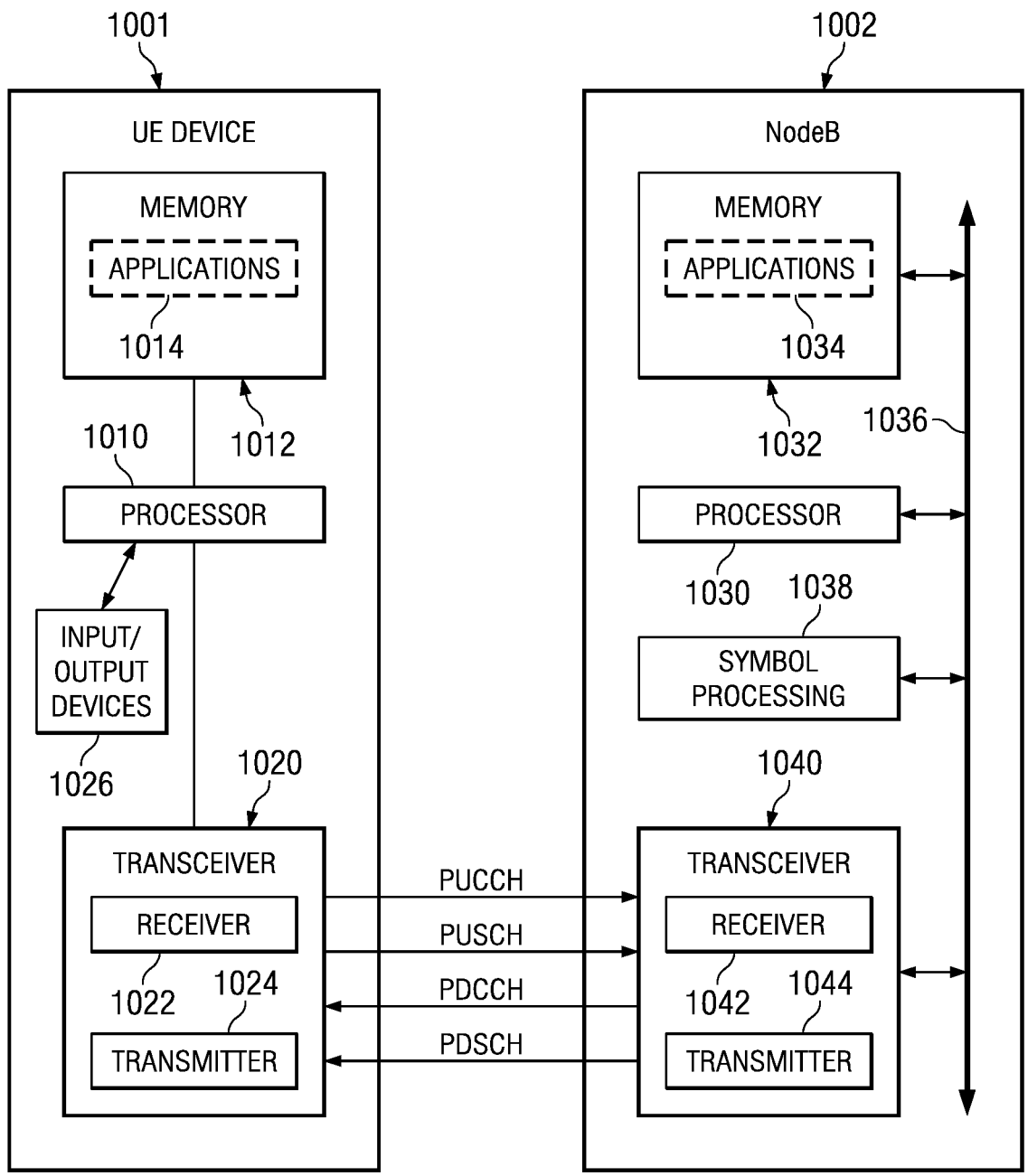
FIG. 5 is a block diagram illustrating internal details of a base station and a mobile user equipment in the network system of FIG. 1 suitable for implementing this invention.

FIG. 5 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination mays be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared Channel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of operating a user equipment (UE), comprising:
   receiving information indicative of a selected set, the selected set being selected from a plurality of sets based on Doppler, each of the sets corresponding to a respective one of a plurality of channel state information reference signal (CSI-RS) configurations;
   receiving a list of CSI-RS patterns for a single cell;
   receiving multiple CSI-RSs corresponding to the list of CSI-RS patterns, the multiple CSI-RSs including a first CSI-RS corresponding to a first CSI-RS pattern, and a second CSI-RS corresponding to a second CSI-RS pattern, the second CSI-RS pattern being different than the first CSI-RS pattern; and
   transmitting CSI feedback corresponding to the received multiple CSI-RSs, the CSI feedback including first CSI corresponding to the first CSI-RS, and second CSI corresponding to the second CSI-RS.

2. The method of claim 1 wherein the UE is further configured to transmit or receive a high-speed flag.

3. The method of claim 2 wherein the UE transmits or receives the high-speed flag.

4. The method of claim 1 wherein the UE is further configured to transmit or receive a high-speed indicator.

5. The method of claim 4 wherein the UE transmits or receives the high-speed indicator.

6. The method of claim 1, further comprising:
   receiving downlink control information (DCI) according to a DCI format with bits indicating a physical downlink shared channel (PDSCH) resource; and
   receiving a PDSCH signal on the indicated PDSCH resource, wherein the received PDSCH signal has at least one layer.

7. The method of claim 1, further comprising:
   receiving downlink control information (DCI) according to a DCI format with bits indicating a physical downlink shared channel (PDSCH) resource; and
   receiving a PDSCH signal on the indicated PDSCH resource, wherein the received PDSCH signal uses precoding.

8. The method of claim 1 wherein the UE receives a signal over at least one single-polarized antenna.

9. The method of claim 1 wherein the UE receives a signal over one or more dual-polarized antennas.

10. The method of claim 1, further comprising:
    receiving downlink control information (DCI) according to a DCI format with bits indicating a physical downlink shared channel (PDSCH) resource; and
    receiving a PDSCH signal on the indicated PDSCH resource, wherein the received PDSCH signal is configured to be sent on multiple antenna ports.

11. A user equipment (UE), comprising circuitry configured to:
    receive information indicative of a selected set, the selected set being selected from a plurality of sets based on Doppler, each of the sets corresponding to a respective one of a plurality of channel state information reference signal (CSI-RS) configurations;
    receive a list of CSI-RS patterns for a single cell;
    receive multiple CSI-RSs corresponding to the list of CSI-RS patterns, the multiple CSI-RSs including a first CSI-RS corresponding to a first CSI-RS pattern, and a second CSI-RS corresponding to a second CSI-RS pattern, the second CSI-RS pattern being different than the first CSI-RS pattern; and
    transmit CSI feedback corresponding to the received multiple CSI-RSs, the CSI feedback including first CSI corresponding to the first CSI-RS, and second CSI corresponding to the second CSI-RS.

12. The UE of claim 11 wherein the UE further comprises circuitry for configuring the UE to transmit or receive a high-speed flag.

13. The UE of claim 11 wherein the UE further comprises circuitry configured to transmit or receive a high-speed flag.

14. The UE of claim 11 wherein the UE further comprises circuitry for configuring the UE to transmit or receive a high-speed indicator.

15. The UE of claim 11 wherein the UE further comprises circuitry configured to transmit or receive a high-speed indicator.

16. The UE of claim 11, wherein the circuitry is further configured to:
receive downlink control information (DCI) according to a DCI format with bits indicating a physical downlink shared channel (PDSCH) resource; and
receive a PDSCH signal on the indicated PDSCH resource, wherein the received PDSCH signal has at least one layer.

17. The UE of claim 11, wherein the circuitry is further configured to:
receive downlink control information (DCI) according to a DCI format with bits indicating a physical downlink shared channel (PDSCH) resource; and
receive a PDSCH signal on the indicated PDSCH resource, wherein the received PDSCH signal uses precoding.

18. The UE of claim 11 wherein the UE further comprises at least one single-polarized antenna.

19. The UE of claim 11 wherein the UE further comprises one or more dual-polarized antennas.

20. The UE of claim 11, wherein the circuitry is further configured to:
receive downlink control information (DCI) according to a DCI format with bits indicating a physical downlink shared channel (PDSCH) resource; and
receive a PDSCH signal on the indicated PDSCH resource, wherein the received PDSCH signal is configured to be sent on multiple antenna ports.

21. A user equipment (UE), comprising:
a transceiver configured to receive a list of channel state information reference signal (CSI-RS) patterns for a single cell; and
a processor configured to configure the UE to receive multiple CSI-RSs corresponding to the list of CSI-RS patterns, wherein the transceiver is further configured to:
receive information indicative of a selected set, the selected set being selected from a plurality of sets based on Doppler, each of the sets corresponding to a respective one of a plurality of CSI-RS configurations;
receive multiple CSI-RSs corresponding to the list of CSI-RS patterns, the multiple CSI-RSs including a first CSI-RS corresponding to a first CSI-RS pattern, and a second CSI-RS corresponding to a second CSI-RS pattern, the second CSI-RS pattern being different than the first CSI-RS pattern; and
transmit CSI feedback corresponding to the received multiple CSI-RSs, the CSI feedback including first CSI corresponding to the first CSI-RS, and second CSI corresponding to the second CSI-RS.

22. The UE of claim 21 wherein the UE further comprises circuitry for configuring the UE to transmit or receive a high-speed flag.

23. The UE of claim 21 wherein the UE further comprises circuitry configured to transmit or receive a high-speed flag.

24. The UE of claim 21 wherein the UE further comprises circuitry for configuring the UE to transmit or receive a high-speed indicator.

25. The UE of claim 21 wherein the UE further comprises circuitry configured to transmit or receive a high-speed indicator.

26. The UE of claim 21, wherein the transceiver is further configured to:
receive downlink control information (DCI) according to a DCI format with bits indicating a physical downlink shared channel (PDSCH) resource; and
receive a PDSCH signal on the indicated PDSCH resource, wherein the received PDSCH signal has at least one layer.

27. The UE of claim 21, wherein the transceiver is further configured to:
receive downlink control information (DCI) according to a DCI format with bits indicating a physical downlink shared channel (PDSCH) resource; and
receive a PDSCH signal on the indicated PDSCH resource, wherein the received PDSCH signal uses precoding.

28. The UE of claim 21 wherein the UE further comprises at least one single-polarized antenna.

29. The UE of claim 21 wherein the UE further comprises one or more dual-polarized antennas.

30. The UE of claim 21, wherein the transceiver is further configured to:
receive downlink control information (DCI) according to a DCI format with bits indicating a physical downlink shared channel (PDSCH) resource; and
receive a PDSCH signal on the indicated PDSCH resource, wherein the received PDSCH signal is configured to be sent on multiple antenna ports.

* * * * *